United States Patent
Kataoka et al.

(10) Patent No.: US 7,897,677 B2
(45) Date of Patent: Mar. 1, 2011

(54) WATER-BASED PRIMER COMPOSITIONS

(75) Inventors: Yasuyuki Kataoka, Hiratsuka (JP); Toshiaki Nagano, Yokohama (JP); Minoru Ishikura, Odawara (JP); Terutaka Takahashi, Hiratsuka (JP); Hideo Sugai, Hiratsuka (JP)

(73) Assignee: Kansai Paint Co., Ltd., Hyogo (JP)

( * ) Notice: Subject to any disclaimer, the term of this patent is extended or adjusted under 35 U.S.C. 154(b) by 230 days.

(21) Appl. No.: 12/225,878

(22) PCT Filed: Apr. 5, 2007

(86) PCT No.: PCT/JP2007/058014
§ 371 (c)(1),
(2), (4) Date: Oct. 1, 2008

(87) PCT Pub. No.: WO2007/119760
PCT Pub. Date: Oct. 25, 2007

(65) Prior Publication Data
US 2010/0021742 A1 Jan. 28, 2010

(30) Foreign Application Priority Data
Apr. 11, 2006 (JP) .............................. 2006-109083

(51) Int. Cl.
*C08L 23/30* (2006.01)
(52) U.S. Cl. .................. 524/504; 523/407; 525/384
(58) Field of Classification Search ............... 524/504; 525/384; 523/407
See application file for complete search history.

(56) References Cited

U.S. PATENT DOCUMENTS 5,534,577 A * 7/1996 Namba et al. ................ 524/377
7,507,779 B2 * 3/2009 Nagano et al. ............... 525/455
7,514,124 B2 * 4/2009 Onoyama et al. ............ 427/475
2002/0198329 A1 * 12/2002 Williams et al. ........... 525/329.7

FOREIGN PATENT DOCUMENTS

| JP | 60-015409 | 1/1985 |
|---|---|---|
| JP | 03-124779 | 5/1991 |
| JP | 03-182534 | 8/1991 |
| JP | 06-080738 | 3/1994 |
| JP | 06-080844 | 3/1994 |
| JP | 06-256592 | 9/1994 |
| JP | 2002-121462 | 4/2002 |
| JP | 2005-112953 | 4/2005 |
| JP | 2005-126615 | 5/2005 |
| WO | 2005/012449 | 2/2005 |
| WO | WO 2005012449 A1 * | 2/2005 |
| WO | 2006/019171 | 2/2006 |

* cited by examiner

*Primary Examiner*—Satya B Sastri
(74) *Attorney, Agent, or Firm*—Wenderoth, Lind & Ponack, L.L.P.

(57) ABSTRACT

This invention provides a water-based primer composition comprising (A) an aqueous dispersion of modified polyolefin, which is prepared by dispersing a modified polyolefin (a) in an aqueous medium, the polyolefin (a) being produced by modifying an unsaturated carboxylic acid- or acid anhydride-modified polyolefin (i) having a melting point not higher than 120° C. and an weight-average molecular weight within a range of 30,000-200,000, further with a compound having polyoxyalkylene chain; (B) at least one kind of aqueous resin selected from aqueous urethane resin, aqueous acrylic resin and aqueous polyester resin; and (C) pigment; the solid weight ratio of the component (A)/component (B) being within a range of 20/80-85/15, and containing the component (C) in an amount within a range of 0.5-200 parts by weight per 100 parts by weight of the total solid resin content of the composition. Use of the water-based primer composition enables to form coating film excelling in water resistance, humidity resistance, gasohol resistance and the like.

14 Claims, No Drawings

WATER-BASED PRIMER COMPOSITIONS

TECHNICAL FIELD

This invention relates to water-based primer compositions which can form coating film excelling in water resistance, humidity resistance, and gasohol resistance, and also to a coating method of plastic shaped articles using the compositions.

BACKGROUND ART

As the parts for outer panels of cars and household electric appliances and the like, shaped articles of polyolefin of which constituent unit is an olefin such as ethylene, propylene and the like are widely used in place of metals. These shaped articles are frequently coated with two-package type top paint containing polyisocyanate compound, and in such occasions, usually chlorinated polyolefin-containing primer is applied in advance, for improving adherability between the top coating film and the shaped articles.

Conventionally, a rubber component (e.g., styrene butadiene rubber, isoprene rubber and the like) or hydroxyl group-containing polyolefin was added to polyolefin shaped articles, for improving adherability or impact resistance. In recent years, however, addition of such a component has been quantitatively reduced or entirely stopped, which gave rise to a problem of deterioration in adherability of conventional primer with such shaped articles.

With the view to solve this problem, the present applicant previously proposed a primer which used specific chlorinated polyolefin and blocked polyisocyanate concurrently with polyol resin (cf. JP 2002-121462A). For this primer, aromatic organic solvent such as toluene or xylene is used to secure solubility of the chlorinated polyolefin, but conversion to water-borne compositions is required also for primer from the viewpoints of sanitary safety and environmental preservation.

Various attempts are made to prepare aqueous dispersions of chlorinated polyolefin, to meet the above demand. For example, JP Hei 3(1991)-182534A and JP Hei 6(1994)-256592A disclose preparation of aqueous dispersions of chlorinated polyolefin comprising converting unsaturated carboxylic acid- or acid anhydride-modified chlorinated polyolefins to water-based compositions, using emulsifier and basic substance, and further using as an emulsifier a compound having polyoxyalkylene structure. The methods disclosed in these patent publications, however, require use of a large quantity of the emulsifier for dispersing the polyolefin in water, and primers in which the resulting aqueous dispersions are blended may form coating film having insufficient water resistance, humidity resistance and gasohol resistance. In particular, when the coating film is thick and baked at such low temperatures as not higher than 90° C., water resistance, humidity resistance and gasohol resistance of the coating film are apt to decrease.

DISCLOSURE OF THE INVENTION

The object of the present invention is to provide a water-based primer composition which can form coating film excelling in water resistance, humidity resistance and gasohol resistance, even when the film is thick and baked at such low temperatures as not higher than 90° C., and also a coating method of plastic shaped articles, using the composition.

We have engaged in concentrative studies to now find that the above object can be accomplished by combined use of an aqueous dispersion of specific modified polyolefin and at least one kind of resin selected from aqueous urethane resin, aqueous acrylic resin and aqueous polyester resin and have come to complete the present invention.

Thus, the invention provides a water-based primer composition characterized by comprising (A) an aqueous dispersion of modified polyolefin, which is prepared by dispersing a modified polyolefin (a) in an aqueous medium, the polyolefin (a) being produced by modifying an unsaturated carboxylic acid- or acid anhydride-modified polyolefin (i) having a melting point not higher than 120° C. and a weight-average molecular weight within a range of 30,000-200,000, further with a compound having polyoxyalkylene chain;

(B) at least one kind of aqueous resin selected from aqueous urethane resin, aqueous acrylic resin and aqueous polyester resin; and (C) pigment;

the solid weight ratio of the component (A)/component (B) being within a range of 20/80-85/15, and containing the component (C) in an amount within a range of 0.5-200 parts by weight per 100 parts by weight of the total solid resin content of the composition.

Use of the water-based primer composition of the present invention achieves the conspicuous effect even when thick coating film is baked at such low temperatures as not higher than 90° C., that the coating film excelling in water resistance, humidity resistance, gasohol resistance and the like can be obtained.

Hereinafter the water-based primer compositions of the invention and a coating method of plastic shaped articles using the same are explained in further details.

Aqueous Dispersion (A) of Modified Polyolefin:

The aqueous dispersion (A) of modified polyolefin, which is used in the present invention, is prepared by dispersing a modified polyolefin (a) in an aqueous medium, said modified polyolefin (a) being prepared by modifying an unsaturated carboxylic acid- or acid anhydride-modified polyolefin (i) having a melting point not higher than 120° C. and an weight-average molecular weight within a range of 30,000-200,000, further with a compound having polyoxyalkylene chain.

The unsaturated carboxylic acid- or acid anhydride-modified polyolefin (i) includes, for example, those formed by such steps as (co)polymerizing at least one kind of olefin selected from $C_{2-10}$ olefins such as ethylene, propylene, butylene, hexene and the like, and further graft copolymerizing the resulting polyolefin with $C_{3-10}$ aliphatic unsaturated carboxylic acid containing at least one, preferably only one, polymerizable double bond per molecule, such as (meth)acrylic acid, maleic acid, fumaric acid, itaconic acid and the like, or anhydrides of such acids, by the means known per se. In particular, those modified with maleic acid or anhydride thereof (maleic anhydride) are preferred. While the amount of the graft copolymerization with the unsaturated carboxylic acid or anhydride thereof is not strictly limited, but is suitably variable according to physical properties desired for the coating film, a generally adequate range is 1-20 wt %, preferably 1.5-15 wt %, inter alia, 2-10 wt %, based on the solid weight of the polyolefin. Among the above-named polyolefins, those containing propylene as the recurring unit are preferred. It is desirable for the weight ratio of propylene units in the modified polyolefin (i) to be within a range of generally 0.5-0.99, in particular, 0.6-0.97, inter alia, 0.7-0.95, from the viewpoints of compatibility with other components and adherability of the formed coating film.

As the polyolefins to be used in the unsaturated carboxylic acid- or acid anhydride-modified polyolefin (i), those per se known can be used without any limitation. Whereas, from the viewpoints of narrow molecular weight distribution and excellent random copolymerizability of resulting polyolefin, those which are prepared with use of single site catalyst as the polymerization catalyst are particularly preferred. "Single site catalyst" refers to those having the same kind of active site (single site), and among such single site catalysts, metallocene catalysts are particularly preferred. Metallocene catalysts are obtainable normally by combining metallocene [bis(cyclopentadienyl)-metal complex and derivatives thereof] which are the compounds having at least one conjugated five-membered ring ligand and containing Group 4-6 or 8 transition metal compounds or Group 3 rare earth transition metals of the periodic table, with promoter such as aluminoxane which can activate metallocene, and further organic aluminum compound such as trimethylaluminum.

The polyolefins can be prepared by the means known per se, for example, by continuously adding alkylaluminum and metallocene catalyst to a reaction vessel while supplying olefin such as propylene, ethylene or the like, and hydrogen thereinto.

Where necessary, the unsaturated carboxylic acid- or acid anhydride-modified polyolefin (i) may further be acrylic-modified. Examples of polymerizable unsaturated monomers useful for the acrylic modification include $C_{1-20}$ alkyl esters of (meth)acrylic acid such as methyl (meth)acrylate, ethyl (meth)acrylate, propyl (meth)acrylate, butyl (meth)acrylate, hexyl (meth)acrylate, cyclohexyl (meth)acrylate, 2-ethylhexyl (meth)acrylate, lauryl (meth)acrylate, stearyl (meth)acrylate and the like; other acrylic monomers such as (meth)acrylic acid, glycidyl (meth)acrylate, 2-hydroxyethyl (meth)acrylate, (meth)acrylamide, (meth)acrylonitrile and the like; and styrene. These can be used either alone or in combination of two or more.

In the present specification, "(meth)acrylic" means "acrylic or methacrylic" and "(meth)acrylate" means "acrylate or methacrylate".

The acrylic modification of modified polyolefins can be carried out, for example, by such method as first reacting an unsaturated carboxylic acid- or acid anhydride-modified polyolefin with, e.g., glycidyl (meth)acrylate which is reactable with carboxyl groups in the modified polyolefin to introduce polymerizable unsaturated groups into the former; and then further (co)polymerizing at least one other monomer with the unsaturated carboxylic acid- or acid anhydride-modified polyolefin into which the polymerizable unsaturated group is introduced. The use amount of such polymerizable unsaturated monomer in the occasions of acrylic modification is, in consideration of compatibility with other components or adherability of formed coating film, desirably not more than 30 wt %, in particular, within a range of 0.1-20 wt %, inter alia, 0.15-15 wt %, based on the solid weight of the resulting modified polyolefin (i).

The unsaturated carboxylic acid- or acid anhydride-modified polyolefin (i) may further be chlorinated, where necessary. Chlorination of the polyolefins can be effected, for example, by blowing chlorine gas into an organic solvent solution or dispersion of such a polyolefin or a modified product thereof. The reaction temperature can be within a range of 50-120° C. The chlorine content in the chlorinated polyolefin (solid content) is suitably variable depending on physical properties desired of the chlorinated polyolefin, while from the viewpoint of adherability of formed coating film, it is desirable to make it generally no higher than 35 wt %, in particular, within a range of 10-30 wt %, inter alia, 12-25 wt %, based on the weight of the chlorinated polyolefin.

It is desirable for thus obtained unsaturated carboxylic acid- or acid anhydride-modified polyolefin (i) to have a melting point not higher than 120° C., in particular, within a range of 40-110° C., inter alia, 50-100° C., and a weight-average molecular weight (Mw) within a range of 30,000-200,000, in particular, 40,000-160,000, inter alia, 50,000-120,000, from the viewpoints of compatibility with other components, adherability of the coating film to plastic shaped articles and interlayer adherability with top coat film. Also from the viewpoints of adherability of formed film to plastic shaped articles and its interlayer adherability with top coat film layer, it is desirable for the modified polyolefin (i) to have a heat of fusion within a range of generally 1-50 mJ/mg, in particular, 2-50 mJ/mg.

Here the melting point and heat of fusion are measured with a differential scanning calorimeter, DSC-5200 (tradename, SEIKO Instrument & Electronics Ltd.), by heating 20 mg of the modified polyolefin sample from −100° C. to 150° C. at a temperature rise rate of 10° C./min. and measuring the quantity of heat. When the heat of fusion is difficult of measurement, the test specimen heated to 120° C. may be cooled at a rate of 10° C./min., allowed to stand for at least two days, and then the quantity of heat can be measured by the above method.

Adjustment of melting point of the modified polyolefin (i) can be effected by varying crystallinity, molecular weight and monomeric composition, in particular, α-olefin monomer content, of the polyolefin.

The weight-average molecular weight (Mw) of the modified polyolefin (i) is the weight-average molecular weight as measured by gel permeation chromatography, which is converted based on that of polystyrene. The measurement is made with HLC/GPC 150C (tradename, Water Co., 60 cm×1), at the column temperature of 135° C., using o-dichlorobenzene as the solvent and at a flow rate of 1.0 ml/min. The test specimen to be poured is formulated by dissolving the sample polyolefin in o-dichlorobenzene at 140° C. for 1-3 hours, to adjust the concentration of the solution to 5 mg/3.4 ml. As the column to be used in the gel permeation chromatography, $GMH_{HR}$-H(S)HT (tradename, Tosoh Corporation) can be named.

It is furthermore desirable that the ratio of the weight-average molecular weight to the number-average molecular weight (Mw/Mn) of the unsaturated carboxylic acid- or acid anhydride-modified polyolefin (i) is within a range of 1.5-4.0, in particular, 2.0-3.5, inter alia, 2.0-3.0, from the viewpoints of the polyolefin's compatibility with other components and adherability of the formed coating film.

According to the invention, the unsaturated carboxylic acid- or acid anhydride-modified polyolefin (i) prepared as above is further modified with a compound having polyoxyalkylene chain. As polyoxyalkylene chain in the polyoxyalkylene chain-containing compound, for example, polyoxyethylene chain, polyoxypropylene chain, polyoxyethylene/polyoxypropylene blocked chain and the like can be named.

It is preferable for the polyoxyalkylene chain-containing compound to have a number-average molecular weight within a range of normally 400-3,000, preferably 500-2,000. When the number-average molecular weight is less than 400, it cannot fully exhibit the effect as the hydrophilic group and there is also a possibility that the performance of the coating film (in particular, water resistance) is adversely affected. On the other hand, when it is more than 3,000, the compound solidifies at room temperature and its solubility is aggravated to render its handling difficult.

The modification with such a polyoxyalkylene chain-containing compound can be carried out, for example, by reacting an unsaturated carboxylic acid- or acid anhydride-modified polyolefin (i) with a compound (ii) having hydroxyl group at its one terminus and polyoxyalkylene chain, or when the unsaturated carboxylic acid- or acid anhydride-modified polyolefin (i) has been further acrylic-modified as above, by reacting it with a compound (iii) having a polymerizable unsaturated group at its one terminus and polyoxyalkylene chain.

Examples of the compound (ii) having hydroxyl group at its one terminus and also polyoxyalkylene chain include polyoxyalkylene alkyl ethers such as polyoxyethylene stearyl ether; polyoxyalkylene alkylphenyl ethers such as polyoxyethylene nonylphenyl ether, polyoxyalkylene dodecylphenyl ether; polyoxyalkylene glycol fatty acid esters such as polyoxyethylene fatty acid ester; and polyoxyalkylene alkylamines such as polyoxyethylene alkylamine, ethylene oxide propylene oxide polymeric adduct of alkylalkanolamine and the like. These can be used either alone or in combination of two or more.

The reaction of an unsaturated carboxylic acid- or acid anhydride-modified polyolefin (i) with a compound (ii) having hydroxyl group at its one terminus and also polyoxyalkylene chain can be carried out, for example, by heat-melting the unsaturated carboxylic acid- or acid anhydride-modified polyolefin (i) at 80-200° C.; and adding thereto the compound (ii) and, where necessary, a basic substance or the like, followed by heating. The use ratio of the compound (ii) in that occasion is preferably within a range of normally 0.5-50 wt parts, in particular, 0.5-25 wt parts, per 100 wt parts of solid content of the unsaturated carboxylic acid- or acid anhydride-modified polyolefin.

Examples of the compound (iii) having a polymerizable unsaturated group at its one terminus and also polyoxyalkylene chain include polyethylene glycol (meth)acrylate, polypropylene glycol (meth)acrylate, polyoxyethylene methyl ether (meth)acrylate, polyoxypropylene methyl ether (meth)acrylate, polyoxyethylene lauryl ether (meth)acrylate, polyoxyethylene nonylphenyl ether (meth)acrylate, polyoxyethylene lauryl ether maleic acid ester, allyl group-containing polyoxyethylene nonylphenyl ether and the like, which can be used either alone or in combination of two or more.

The reaction of an unsaturated carboxylic acid- or acid anhydride-modified polyolefin (i) with the compound (iii) having polymerizable unsaturated group at its one terminus and also polyoxyalkylene chain can be carried out by, for example, heat-melting the unsaturated carboxylic acid- or acid anhydride-modified polyolefin at 80-200° C.; adding thereto, e.g., glycidyl (meth)acrylate, 2-hydroxyethyl (meth)acrylate or the like which has reactivity with the carboxyl groups in the unsaturated carboxylic acid- or acid anhydride-modified polyolefin (i) similarly to the earlier description of acrylic modification, and where necessary polymerization inhibitor, basic substance or the like; heating the whole to first introduce the polymerizable unsaturated groups into the modified polyolefin; and then adding the compound (iii) and, where necessary, polymerization initiator or the like and heating the same. The desirable use ratio of the compound (iii) is normally within a range of 0.5-50 wt parts, in particular, 0.5-25 wt parts, per 100 wt parts of solid content of the unsaturated carboxylic acid- or acid anhydride-modified polyolefin (i).

According to the invention, the aqueous dispersion (A) of the modified polyolefin can be obtained by dispersing the modified polyolefin (a) prepared as above, in an aqueous medium. In that occasion, a part or the whole of carboxyl groups in the modified polyolefin (a) may be neutralized with amine compound and/or an emulsifier may be used to effect the aqueous dispersion, where necessary. Because the modified polyolefin (a) has polyoxyalkylene chain, it is also possible to disperse the modified polyolefin in an aqueous medium without using such amine compound or emulsifier, or using only minor amount thereof.

Examples of the amine compound include tertiary amines such as triethylamine, tributylamine, dimethylethanolamine, triethanolamine and the like; secondary amines such as diethylamine, dibutylamine, diethanolamine, morpholine and the like; and primary amines such as propylamine, ethanolamine and the like.

When such amine compound is used, its use amount is desirably within a range of normally 0.1-1 molar equivalent to the carboxyl groups in the modified polyolefins.

Examples of the emulsifier include nonionic emulsifiers such as polyoxyethylene monooleyl ether, polyoxyethylene monostearyl ether, polyoxyethylene monolauryl ether, polyoxyethylene tridecyl ether, polyoxyethylene phenyl ether, polyoxyethylene nonylphenyl ether, polyoxyethylene octylphenyl ether, polyoxyethylene monolaurate, polyoxyethylene monostearate, polyoxyethylene monooleate, sorbitan monolaurate, sorbitan monostearate, sorbitan trioleate, polyoxyethylene sorbitan monolaurate and the like; and anionic emulsifiers such as sodium salt or ammonium salt and the like of alkylsulfonic acid, alkylbenzenesulfonic acid, alkylphosphoric acid an the like. Furthermore, polyoxyalkylene group-containing anionic emulsifiers having anionic group and polyoxyalkylene group such as polyoxyethylene group or polyoxypropylene group within a molecule, or reactive anionic emulsifiers having the anionic group and polymerizable unsaturated group within a molecule, and the like can also be used. These can be each used alone or in combination of two or more.

The use amount of the emulsifier is desirably normally no more than 25 wt parts, in particular, within a range of 0.5-20 wt parts, per 100 wt parts of solid content of the modified polyolefin (a).

Aqueous Resin (B):

The water-based primer compositions of the present invention comprise, besides the above-described aqueous dispersion (A) of modified polyolefin, at least one kind of aqueous resin (B) selected from aqueous urethane resins, aqueous acrylic resins and aqueous polyester resins.

Aqueous urethane resins are water-soluble or water-dispersible resins having urethane linkages in their molecules, examples of which include those in the forms of self-emulsifiable emulsions having acid values, emulsions used concurrently with emulsifier or water-soluble resins. Those in the form of dispersions are particularly preferred. Urethane dispersion can be obtained by preparing urethane prepolymer in advance by reacting diol with diisocyanate and, where necessary, further with dimethylolalkanoic acid or the like, normally in the presence of emulsifier, and forcedly emulsifying or self-emulsifying the resulting prepolymer while dispersing it in water. Skeletal structure of the urethane resin can be formed of, for example, ether type, carbonate type or ester type resin. Of those, urethane resins having ether type or carbonate type skeletal structure are preferred from the viewpoint of water resistance of the formed coating film. Those urethane resins may also contain hydroxyl groups.

As the aqueous acrylic resins, water-soluble acrylic resins having a weight-average molecular weight within a range of normally 5,000-100,000, preferably 5,000-75,000, inter alia, 5,000-50,000; or acrylic resin emulsions having a weight-average molecular weight normally not less than 50,000, preferably at least 75,000, inter alia, at least 100,000; can be used, which are obtained through copolymerization of monomeric mixtures normally comprising hydrophilic group-containing polymerizable unsaturated monomers such as carboxyl group-containing polymerizable unsaturated monomers and other polymerizable unsaturated monomers. These weight-average molecular weights are the weight-average molecular weights as measured by means of gel permeation chromatography using tetrahydrofuran as the solvent, which are converted based on that of polystyrene. As the gel permeation chromatography device, HLC8120 GPC (tradename, Tosoh Corporation) can be used, and as the columns for the gel permeation chromatography, four columns of TSKgel G-4000 HXL, TSKgel G-3000 HXL, TSKgel G-2500 HXL and TSKgel G-2000 HXL (tradenames, Tosoh Corporation) are used.

Examples of the carboxyl group-containing polymerizable unsaturated monomer include (meth)acrylic acid, crotonic acid, maleic acid, fumaric acid, itaconic acid and half monoalkyl esters of dicarboxylic acids among the above-named. As the hydrophilic group-containing polymerizable unsaturated monomers other than these, for example, polyalkylene chain-containing polymerizable unsaturated monomers such as polyethylene glycol (meth)acrylate, polypropylene glycol (meth)acrylate and the like; sulfonic acid group-containing polymerizable unsaturated monomers such as 2-acrylamido-2-methylpropanesulfonic acid, sulfoalkyl (meth)acrylate such as 2-sulfoethyl (meth)acrylate and the like; tertiary amino group-containing polymerizable unsaturated monomers such as N,N-dimethylaminoethyl (meth)acrylate, N,N-diethylaminoethyl (meth)acrylate and the like; quaternary ammonium salt group-containing polymerizable unsaturated monomers such as 2-(methacryloyloxy)ethyltrimethylammonium chloride, 2-(methacryloyloxy)ethyltrimethylammonium bromide and the like; and quaternary ammonium salt-forming carboxyl group-containing polymerizable unsaturated monomers can be named.

As the other polymerizable unsaturated monomers, for example, $C_{1-24}$ alkyl or cycloalkyl esters of (meth)acrylic acid such as methyl (meth)acrylate, ethyl (meth)acrylate, n- and i-propyl (meth)acrylates, n-, i- and t-butyl (meth)acrylates, 2-ethylhexyl (meth)acrylate, cyclohexyl (meth)acrylate, lauryl (meth)acrylate, isobornyl (meth)acrylate and the like; hydroxyalkyl esters of (meth)acrylic acid such as 2-hydroxyethyl (meth)acrylate, 2- or 3-hydroxypropyl (meth)acrylate, 4-hydroxybutyl (meth)acrylate and the like; glycidyl (meth)acrylate, acrylonitrile, acrylamide, styrene, vinyltoluene, vinyl acetate, vinyl chloride, 1,6-hexanediol diacrylate and the like can be named, which may be used either alone or in combination of two or more.

Copolymerization of the monomeric mixtures can be carried out by the means known per se, for example, water-soluble acrylic resin can be formed by solution polymerization method or the like, and acrylic resin emulsion, by emulsion polymerization method or the like.

Particularly when the aqueous acrylic resin is an acrylic resin emulsion obtained by emulsion polymerization, it may be multilayer-structured particulate emulsion which can be obtained by multi-stage emulsion polymerization of a monomeric mixture in the presence of water and an emulsifier.

Acid groups such as carboxyl group originated from those hydrophilic group-containing polymerizable unsaturated monomers in the aqueous acrylic resin may be neutralized with a basic substance, where necessary. The basic substance is preferably water-soluble, and examples of which include ammonia, methylamine, ethylamine, propylamine, butylamine, dimethylamine, trimethylamine, triethylamine, ethylenediamine, morpholine, methylethanolamine, dimethylethanolamine, diethanolamine, triethanolamine, diisopropanolamine, 2-amino-methylpropanol and the like. They can be used either alone or in combination of two or more.

Aqueous polyester resin can be obtained by neutralizing oil-free or oil-modified polyester resin which is produced by esterification reaction using polyhydric alcohol and polybasic acid, and further, where necessary, monobasic acid, oil component (including fatty acid thereof). It is adequate for the polyester resin to have a weight-average molecular weight within a range of normally about 3,000-100,000, preferably 4,000-65,000, inter alia, 5,000-30,000. The weight-average molecular weight of such polyester resins can be measured by a method similar to that used for measuring weight-average molecular weight of above acrylic resins.

Examples of the polyhydric alcohol include ethylene glycol, diethylene glycol, propylene glycol, butanediol, pentanediol, hexanediol, 2,2-dimethylpropanediol, glycerine, trimethylolpropane, pentaerythritol, ethylene oxide adducts or propylene oxide adducts of bisphenol compounds, and the like. These can be used either alone or in combination of two or more. As examples of the polybasic acid, phthalic acid, isophthalic acid, tetrahydrophthalic acid, hexahydrophthalic acid, maleic acid, succinic acid, adipic acid, sebacic acid, trimellitic acid, pyromellitic acid and anhydrides thereof can be named, which can be used either alone or in combination of two or more. Also as the monobasic acid, for example, benzoic acid or t-butylbenzoic acid and the like can be named, and as the oil component, for example, castor oil, dehydrated castor oil, safflower oil, soybean oil, linseed oil, tall oil, coconut oil and fatty acids thereof can be named, which can be used either alone or in combination of two or more.

Introduction of carboxyl groups into the polyester resin can be effected by, for example, concurrent use of polybasic acid having at least three carboxyl groups per molecule, such as trimellitic acid, pyromellitic acid and the like, or half-esterification addition of dicarboxylic acid. Also introduction of hydroxyl groups can be easily effected by concurrent use of polyhydric alcohol having at least 3 hydroxyl groups per molecule, such as glycerine, trimethylolpropane and the like.

Carboxyl groups in the polyester resin may be neutralized with aforesaid basic substance, where necessary.

Those aqueous acrylic resins or aqueous polyester resins preferably contain hydroxyl groups and, in consideration of dispersibility in water, compatibility with other components and curability of the formed coating film, can have a hydroxyl value within a range of generally 20-200 mgKOH/g, preferably 20-150 mgKOH/g, and an acid value within a range of generally 1-100 mgKOH/g, preferably 10-70 mgKOH/g.

The aqeuous resin (B) which is at least a member selected from above aqueous urethane resin, aqueous acrylic resin and aqueous polyester resin can be co-used with the aqueous dispersion (A) of modified polyolefin, at such ratios as will render the solid weight ratio of the aqueous dispersion (A)/aqueous resin (B) to fall within a range of 20/80-85/15, preferably 25/75-80/20, inter alia, 30/70-70/30, from the viewpoints of water dispersibility, compatibility with other components and curability of the formed coating film.

Pigment (C):

The water-based primer composition of the present invention can further contain pigment (C). As the pigment (C), electrically conducting pigment, coloring pigment, extender pigment and the like can be named. In particular, use of electrically conducting pigment gives the primer compositions which form electrically conductive coating film, which enables electrostatic coating of the top coat.

Any electrically conducting pigment can be used without particular limitation, so long as it can impart electrical conductivity to the formed coating film, which may be in any of such forms as particles, flakes, fibers (including whiskers) and the like. Examples of such pigment include conductive carbon such as conductive carbon black, carbon nanotube, carbon nanofiber, carbon microcoil and the like; and metal powder such as of silver, nickel, copper, graphite, aluminum and the like. Furthermore, such pigments as antimony-doped tin oxide, phosphorus-doped tin oxide, acicular titanium oxide with tin oxide/antimony-coated surface, antimony oxide, zinc antimonate, indium tin oxide, carbon or graphite whiskers with tin oxide-coated surface; flaky mica pigment whose surface is coated with at least one of conductive metal oxide selected from the group consisting of tin oxide, antimony-doped tin oxide, tin-doped indium oxide (ITO), fluorine-doped tin oxide (FTO), phosphorus-doped tin oxide and nickel oxide; and conductive pigment of titanium dioxide particles containing tin oxide and phosphorus at their surfaces; which are used either alone or in combination of two or more.

Of these, use of conductive carbon is preferred. In particular, conductive carbon having BET specific surface area of at least 400 $m^2/g$, preferably at least 500 $m^2/g$, inter alia, at least 600 $m^2/g$, can be favorably used.

As the coloring pigment, for example, titanium dioxide, red iron oxide, aluminum paste, azo pigments, phthalocyanine pigments and the like can be named, and as the extender pigment, for example, talc, silica, calcium carbonate, barium sulfate, zinc flower (zinc oxide) and the like can be named. These can be used either alone or in combination of two or more.

When the water-based primer composition of the present invention is required to form coating film of high value, the pigment (C) desirably contains white pigment, in particular, titanium dioxide, which has an average particle diameter within a range of about 0.05-about 2 µm, in particular, 0.1-1 µm, from the viewpoint of favorable decorative effect and chemical resistance.

Suitable use amount of the pigment (C) in consideration of adherability and water resistance of the formed coating film, is within a range of generally 0.5-200 wt parts, in particular, 1-150 wt parts, inter alia, 5-150 wt parts, per 100 wt parts of the total solid resin content of the composition. Where conductive carbon is used, its suitable use amount in consideration of the value and conductivity of the formed coating film is within a range of normally 0.5-30 wt parts, in particular, 1-20 wt parts, inter alia, 3-20 wt parts, per 100 wt parts of the total solid resin content of the composition. Furthermore, when a white pigment is used as above, it is desirable to so select its content as will make the L-value of the formed coating film at least 35. An adequate range therefor is normally 50-150 wt parts, preferably 70-130 wt parts, inter alia, 70-120 wt parts, per 100 wt parts of the total solid resin content of the composition.

Water-Based Primer Compositions:

The water-based primer compositions of the invention can furthermore contain crosslinking agent, where necessary, besides the above-described aqueous dispersion (A) of modified polyolefin, aqueous resin(B) and pigment (C).

As the crosslinking agent, normally amino resin and/or optionally blocked polyisocyanate which are reactable with hydroxyl groups contained in above resin (B) or the like, can be used. Epoxy compound reactable with carboxyl groups in the aqueous dispersion (A) of modified polyolefin may also be used as the crosslinking agent.

As the amino resin, for example, melamine resin, urea resin, benzoguanamine resin or the like can be named, melamine resin being preferred among those. As the melamine resin, alkyletherified melamine resins which are etherified with such alkyl groups as methyl, ethyl, n-butyl, isobutyl, hexyl, 2-ethylhexyl and the like are particularly preferred, which may be either hydrophobic or hydrophilic. These melamine resins may further have methylol group, imino group and the like. It is desirable that the amino resin has a number-average molecular weight within a range of normally 500-5,000, in particular, 800-3,000. Such number-average molecular weight of amino resin is the value determined by converting its weight-average molecular weight as measured by gel permeation chromatography using tetrahydrofuran as the solvent at a flow rate of 1.0 ml/min., based on the weight-average molecular weight of polystyrene. As the gel permeation chromatography device, HLC8120GPC (tradename, Tosoh Corporation) can be used, and as the columns, TSKgel G-4000 HXL, TSKgel G-3000 HXL, TSKgel G-2500 HXL and TSKgel G-2000 HXL (tradenames, Tosoh Corporation) can be used.

The optionally blocked polyisocyanates include polyisocyanate compounds having at least two free isocyanate groups per molecule, the isocyanate groups being optionally blocked with blocking agent.

Examples of the polyisocyanate compounds include aliphatic polyisocyanates such as hexamethylene diisocyanate, trimethylhexamethylene diisocyanate, dimeric acid diisocyanate, lysine diisocyanate and the like; biuret type adducts and isocyanurate ring adducts of these aliphatic polyisocyanates; alicyclic diisocyanates such as isophorone diisocyanate, 4,4'-methylenebis-(cyclohexylisocyanate), methylcyclohexane-2,4- or 2,6-diisocyanate, 1,3- or 1,4-di(isocyanatomethyl)cyclohexane, 1,4-cyclohexane diisocyanate, 1,3-cyclopentane diisocyanate, 1,2-cyclohexane diisocyanate and the like; biuret type adducts and isocyanurate ring adducts of these alicyclic diisocyanates; aromatic diisocyanate compounds such as xylylene diisocyanate, tetramethylxylylene diisocyanate, tolylene diisocyanate, 4,4'-diphenylmethane diisocyanate (MDI), 1,5-naphthalene diisocyanate, 1,4-naphthalene diisocyanate, 4,4'-toluidine diisocyanate, 4,4'-diphenylether diisocyanate, (m- or p-)phenylene diisocyanate, 4,4'-biphenylene diisocyanate, 3,3'-dimethyl-4,4'-biphenylene diisocyanate, bis(4-isocyanatophenyl)-sulfone, isopropylidenebis(4-phenylisocyanate) and the like; biuret type adducts and isocyanurate ring adducts of these aromatic diisocyanates; hydrogenated MDI and derivatives of hydrogenated MDI; polyisocyanates having at least three isocyanate groups per molecule such as triphenylmethane-4,4',4"-triisocyanate, 1,3,5-triisocyanatobenzene, 2,4,6-triisocyanatotoluene, 4,4'-dimethyldiphenylmethane-2,2',5,5'-tetraisocyanate and the like; biuret type adducts and isocyanurate ring adducts of these polyisocyanates; urethanation adducts formed by reacting polyol such as ethylene glycol, propylene glycol, 1,4-butylene glycol, dimethylolpropionic acid, polyalkylene glycol, trimethylolpropane, hexanetriol and the like, with polyisocyanate compound at such a ratio that the isocyanate groups in the polyisocyanate compound become excessive to the hydroxyl groups in the polyol; and biuret type adducts and isocyanurate ring adducts of these urethanation adducts.

Blocked polyisocyanates are formed by adding blocking agent to isocyanate groups in the above polyisocyanate compounds. It is desirable that the blocked polyisocyanate compound formed upon the addition is stable at ambient temperature but when heated to the baking temperature of the coating film (normally about 80- about 200° C.), the blocking agent is dissociated therefrom to regenerate the free isocyanate groups. Examples of the blocking agent meeting the requirement include phenolic compounds such as phenol, cresol, xylenol, nitrophenol, ethylphenol, hydroxydiphenyl, butylphenol, isopropylphenol, nonylphenol, octylphenol, methyl hydroxybenzoate and the like; lactams such as ε-caprolactam, δ-valerolactam, γ-butyrolactam, β-propiolactam and the like; aliphatic alcohols such as methanol, ethanol, propyl alcohol, butyl alcohol, amyl alcohol, lauryl alcohol and the like; ethers such as ethylene glycol monomethyl ether, ethylene glycol monoethyl ether, ethylene glycol monobutyl ether, diethylene glycol monomethyl ether, diethylene glycol monoethyl ether, propylene glycol monomethyl ether, methoxymethanol and the like; benzyl alcohol; glycolic acid; glycolic acid esters such as methyl glycolate, ethyl glycolate, butyl glycolate and the like; lactic acid; lactic acid esters such as methyl lactate, ethyl lactate, butyl lactate and the like; alcohols such as methylolurea, methylolmelamine, diacetone alcohol, 2-hydroxyethyl acrylate, 2-hydroxyethyl methacrylate and the like; oximes such as formamidoxime, acetamidoxime, acetoxime, methylethylketoxime, diacetylmonoxime, benzophenoxime, cyclohexanoxime and the like; dialkyl esters of malonic acid such as dimethyl malonate, diethyl malonate, diisopropyl malonate, di-n-butyl malonate, diethyl methylmalonate, benzylmethyl malonate, diphenyl malonate and the like; active methylenes such as acetoacetic acid esters, e.g., methyl acetoacetate, ethyl acetoacetate, isopropyl acetoacetate, n-propyl acetoacetate, benzyl acetoacetate, phenyl acetoacetate, and acetylacetone and the like; mercaptans such as butyl mercaptan, t-butyl mercaptan, hexyl mercaptan, t-dodecyl mercaptan, 2-mercaptobenzothiazole, thiophenol, methylthiophenol, ethylthiophenol and the like; acid amides such as acetanilide, acetanisidide, acetotoluide, acrylamide, methacrylamide, acetamide, stearamide, benzamide and the like; imides such as succinimide, phthalimide, maleimide and the like; amines such as diphenylamine, phenylnaphthylamine, xylidine, N-phenylxylidine, carbazole, aniline, naphthylamine, butylamine, dibutylamine, butylphenylamine and the like; imidazole compounds such as imidazole, 2-ethylimidazole and the like; pyrazoles such as 3,5-dimethylpyrazole; urea compounds such as urea, thiourea, ethyleneurea, ethylenethiourea, diphenylurea and the like; carbamic acid esters such as phenyl N-phenylcarbamate; imines such as ethyleneimine, propyleneimine and the like; and sulfites such as sodium bisulfite, potassium bisulfite and the like. Of these, particularly the polyisocyanates blocked with active methylene-type blocking agents are preferred from the viewpoints of low temperature curability and compatibility with the aqueous dispersion (A) of the modified polyolefin and resin (B).

Where necessary, above blocked polyisocyanates can be imparted with water dispersibility. Such water-dispersible blocked polyisocyanates include, for example, polyisocyanate compounds whose isocyanate groups are blocked with a blocking agent containing hydroxymonocarboxylic acid and which are made water-dispersible by neutralizing the carboxyl groups introduced by the hydroxymonocarboxylic acid; or those which are rendered water-dispersible by addition of, or reaction with, a surfactant or the like.

The epoxy compounds are subject to no particular limitation so long as they have at least two epoxy groups per molecule, and those per se known can be used, examples of which include bisphenol type epoxy resin, novolak type epoxy resin, polyethylene glycol diglycidyl ether and the like. Where necessary, the epoxy compounds can be used as dispersed in water.

Use of the epoxy compounds as the crosslinking agent is particularly desirable, because the formed coating film shows favorable humidity resistance even when baked at such low temperatures as not higher than 90° C., when the resin (B) has tertiary amino groups.

The content of the crosslinking agent can be generally not more than 40 wt %, in particular, within a range of 3-30 wt %, inter alia, 5-20 wt %, based on the total solid resin content of the composition, from the viewpoints of compatibility with the aqueous dispersion (A) of modified polyolefin or resin (B), and curability, adherability and water resistance of the formed coating film. Here the "total solid resin content of the composition" signifies the total amount of the modified polyolefin (a) in the aqueous dispersion (A), aqueous resin (B) and the crosslinking agent.

The water-based primer compositions of the present invention can contain terpen resin, where necessary in respect of compatibility with paint. As the terpen resin, for example, terpen, terpen-phenol, hydrogenated aromatic modified terpen resin and the like can be named. It is normally desirable that the terpen resin has a melting point within a range of 30-120° C. Melting point of the terpen resin can be measured by a method similar to that used for the modified polyolefin (i). It is desirable that the terpen resin is used in an amount normally not more than 30 wt %, preferably within a range of 5-20 wt %, based on the total solid resin content of the composition.

The water-based primer compositions of the present invention can further suitably contain, where necessary, paint additives such as curing catalyst, rheology controlling agent, defoaming agent, organic solvent and the like.

Coating

When coated on plastic shaped articles, the water-based primer composition of the present invention can form coating film excelling in adherability, humidity resistance, gasohol resistance and the like.

Examples of plastic shaped articles include, those used in outer panel parts of cars such as bumpers, spoilers, grilles, fenders and the like; and outer panel parts of household electric appliances. As the construction material of such plastic shaped articles, for example, polyolefins obtained by (co)polymerization of one or at least two kinds of $C_{2-10}$ olefins such as ethylene, propylene, butylene, hexene and the like are particularly suitable. Whereas, the water-based primer compositions of the present invention are applicable also to polycarbonate, ABS resin, urethane resin, polyamide and the like, besides the foregoing.

These plastic shaped articles can be suitably subjected to degreasing, washing with water or the like by the means known per se, prior to the coating with the water-based primer compositions of the present invention.

Coating of the water-based primer composition of the invention can be carried out by such means as air spray, airless spray, immersion coating, brushing or the like, to form on the object plastic shaped articles normally 1-30 μm-thick, preferably 5-20 μm-thick film in terms of dry film thickness. After coating with the water-based primer composition, the coated surface may be set at room temperature for 1-60 minutes, or preheated at temperatures of about 40- about 80° C. for around 1-60 minutes, or can be heated at about 60- about 140° C., preferably at about 70- about 120° C., for around 20-40 minutes, to cure the coating film.

The primer coating film formed as above preferably has a surface resistivity not higher than $1 \times 10^8$ $\Omega/\square$, when conductivity is imparted. Whereupon the conductive primer coating film enables favorable electrostatic coating in the next step.

In the present specification, the measurement of surface resistivity can be carried out with a surface resistance meter, Trek Model 150 (tradename, TREK Co.) as to a coating film which is applied to provide a dry film thickness of about 5-15 μm and dried at 80° C. for 10 minutes (unit: $\Omega/\square$).

Onto the coated surface of a plastic shaped article applied with the water-based primer composition of the present invention as above, a top coat can be applied. As the top coat, a coloring paint may be applied by itself, or the coloring paint may be used as the base coat in successive application of the base coat and clear coat.

As the coloring base coat, those known per se can be used, which normally use organic solvent and/or water as the main solvent and contain mainly a coloring component such as coloring pigment, effect pigment, dyes and the like, and resin component such as base resin, crosslinking agent and the like. As the base resin to be used in the coloring base coat, for example, acrylic resin, polyester resin, alkyd resin and the like which have crosslinkable functional groups such as hydroxyl, epoxy, carboxyl and silanol groups, can be named. Also as the crosslinking agent, amino resins such as melamine resin, urea resin and the like, or optionally blocked polyisocyanate, polyepoxide, polycarboxylic acid and the like, which are reactable with these functional groups, can be named.

The coloring base coat can further suitably contain, where necessary, paint additives such as extender, curing catalyst, UV absorber, coated surface regulating agent, rheology controlling agent, antioxidant, defoamer, wax, antiseptic and the like.

The coloring base coat can be applied normally to provide a coating film of 5-50 μm, preferably 10-20 μm, in dry film thickness, and the resulting coated surface can be set at room temperature for 1-60 minutes or preheated at about 40- about 80° C. for around 1-20 minutes, where necessary, or it can be cured by heating at about 60- about 140° C., preferably about 80- about 120° C., for around 20-40 minutes.

In particular, when the primer composition of this invention is to form a highly white-colored primer coating film, a white base coat and iridescent pearlescent base coat can be successively applied thereon to form a colored base coating layer.

As the clear coat, those organic solvent-based or water-based thermosetting paints which normally contain as the main components a resin component comprising base resin and crosslinking agent, and organic solvent or water and further, where necessary, are blended with paint additives such as UV absorber, light stabilizer, curing catalyst, coated surface regulating agent, rheology controlling agent, antioxidant, defoamer, wax and the like, and which moreover have the transparency to an extent that the coated films thereunder are visible through the clear coating film, can be used.

As the base resin, for example, such resins as acrylic resin, polyester resin, alkyd resin, fluorine-containing resin, urethane resin, silicon-containing resin and the like, which contain at least one kind of crosslinkable functional groups such as hydroxyl, carboxyl, silanol and epoxy groups, can be named, hydroxyl group-containing acrylic resin being particularly preferred. As the crosslinking agent, for example, melamine resin, urea resin, (blocked) polyisocyanate compound, epoxy compound, carboxyl group-containing compound, acid anhydride, alkoxysilane group-containing compound and the like can be named, which are reactable with above-named functional groups. Of these, blocked isocyanate compound is particularly preferred.

The clear coat can be applied to provide a coating film of 10-50 μm, preferably 20-40 μm, in dry film thickness, and the resulting coating film can be set at room temperature for 1-60 minutes or preheated at about 40- about 80° C. for around 1-20 minutes, where necessary, and thereafter cured by heating at about 60- about 140° C., preferably about 70- about 120° C., for around 20-40 minutes.

Thus a plastic shaped article coated with a primer coating film of the present invention, on which a top coat, in particular, that comprising coloring base coating film and clear coating film, is applied, can be obtained.

EXAMPLES

Hereinafter the present invention is more specifically explained referring to Examples, it being understood that the invention is not limited to these Examples only. Unless otherwise specified, parts and % are weight part and weight %.

Preparation of Aqueous Dispersions of Modified Polyolefin

Production Example 1

In a 4-necked flask equipped with a stirrer, cooling tube, thermometer and dropping funnel, 100 g of maleic anhydride-grafted polypropylene (polypropylene prepared with use of metallocene catalyst, which was modified with 4 wt % thereto of maleic acid; melting point 80° C., Mw about 150,000, Mw/Mn about 2.5) was heat-melted at 140° C., to which 15 g of polyoxyethylene stearyl ether (Newcol 1820, tradename, Nihon Nyukazai Co., Ltd., polyoxyethylene compound having hydroxyl group at its one terminus) was added and reacted at 140° C. for 4 hours under stirring. After the reaction, the reaction mixture was cooled to 90° C., followed by addition of deionized water and filtration, to provide an aqueous dispersion (A-1) of the modified polyolefin having a solid content of 30%.

Production Example 2

In a 4-necked flask equipped with a stirrer, cooling tube, thermometer and dropping funnel, 200 g of maleic anhydride-grafted polypropylene (polypropylene prepared with use of metallocene catalyst, which was modified with 4 wt % thereto of maleic acid; melting point 80° C., Mw about 150,000, Mw/Mn about 2.5) was heat-melted at 120° C., to which 10 g of 2-hydroxyacrylate, 0.1 g of polymerization inhibitor (di-t-butylhydroxytoluene) and 2.0 g of triethylamine were added, followed by an hour's stirring. Into the flask then 30 g of polyethylene glycol monomethacrylate (BLENMER PE-350, tradename, NOF Corporation) and 0.3 g of polymerization initiator (PERBUTYL O, tradename, NOF Corporation) were added under stirring at 120° C. over an hour to carry out the reaction. After the reaction, 4 g of triethylamine was added, followed by 30 minutes' stirring. The reaction mixture was cooled to 90° C., followed by addition of deionized water and filtration, to provide an aqueous dispersion (A-2) of the modified polyolefin having a solid content of 30%.

Production Example 3

In a 4-necked flask equipped with a stirrer, cooling tube, thermometer and dropping funnel, 100 g of maleic anhydride-grafted polypropylene (polypropylene prepared with use of metallocene catalyst, which was modified with 4 wt % thereto of maleic acid; melting point 80° C., Mw about 150,000, Mw/Mn about 2.5) was heat-melted at 120° C., to which 4 g of triethylamine was added, followed by addition of 30 g of polyoxyethylene stearyl ether (Newcol 1820, tradename, Nihon Nyukazai Co., Ltd.) and an hour's stirring. Thereafter the reaction mixture was cooled to 90° C., followed by addition of deionized water and filtration, to provide an aqueous dispersion (A-3) of the modified polyolefin having a solid content of 30%.

Preparation of a Hydroxyl Group-Containing Acrylic Resin Solution

A reactor equipped with a stirrer, reflux condenser and thermometer was charged with 40 parts of propylene glycol monomethyl ether, maintained at 120° C. by heating, and into which a mixture of 53 parts of cyclohexyl methacrylate, 20 parts of n-butyl acrylate, 21 parts of 2-hydroxyethyl acrylate, 6 parts of acrylic acid and 5 parts of azobisisobutyronitrile was dropped over 3 hours. Thereafter the system was aged for an hour at the same temperature, followed by further dropwise addition of a liquid mixture of 1 part of azobisdimethylvaleronitrile and 10 parts of propylene glycol monomethyl ether over an hour. After subsequent an hour's aging, 7.4 parts of dimethylethanolamine and 193 parts of deionized water were added under stirring, to provide a hydroxyl group-containing acrylic resin solution (B-1) having an acid value of 47 mgKOH/g, hydroxyl value of 101 mgKOH/g and weight-average molecular weight of about 10,000.

Preparation of a Hydroxyl Group-Containing Polyester Resin Solution

A reaction vessel was charged with 105 parts of neopentyl glycol, 273 parts of trimethylolpropane, 320 parts of butylethylpropanediol, 219 parts of adipic acid and 385 parts of isophthalic acid, which were reacted at 220° C. for 6 hours. Thereafter 76 parts of trimellitic anhydride was added and allowed to react at 170° C. for 30 minutes. Then 5.5 parts of dimethylethanol-amine and 120 parts of deionized water were added under stirring to provide a hydroxyl group-containing polyester resin solution (B-2) having an acid value of 35 mgKOH/g, hydroxyl value of 140 mgKOH/g and weight-average molecular weight of about 5,000.

Preparation of Water-Based Primer

Example 1

Blending 50 parts by solid weight of the aqueous dispersion (A-1) of the modified polyolefin, 20 parts by solid weight of the hydroxyl group-containing acrylic resin solution (B-1), 30 parts by solid weight of an aqueous urethane resin (B-3) (UX-5210, tradename, Sanyo Chemical Industries, Ltd., a urethane dispersion), and 8 parts of Ketjen Black EC-300J (tradename, Lion Corporation, conductive carbon black pigment) according to the accepted practice and diluting the blend with deionized water to a solid content of 30%, water-based primer (1) was obtained.

Examples 2-8 and Comparative Examples 1-4

Example 1 was repeated except that the components used and their ratios were varied in each run as shown in Table 1, to provide water-based primers (2)-(12).

In the Table 1, the blend ratios are indicated in terms of solid contents, and (note 1) to (note 3) in the Table 1 denote the following.

(Note 1) Aqueous dispersion (A-4) of modified polyolefin: EH-801, tradename, Toyo Kasei Kogyo Co., Ltd., aqueous dispersion of chlorinated polyolefin, degree of chlorination 16%, solid content 30%.

(Note 2) VULCAN XC-72: tradename, Cabot Specialty Chemicals, Inc., conductive carbon black pigment.

(Note 3) JR-806: tradename, Tayca Corporation, titanium white.

TABLE 1

| | | Example | | | | | | | | Comparative Example | | | |
|---|---|---|---|---|---|---|---|---|---|---|---|---|---|
| | | 1 | 2 | 3 | 4 | 5 | 6 | 7 | 8 | 1 | 2 | 3 | 4 |
| water-based primer | | (1) | (2) | (3) | (4) | (5) | (6) | (7) | (8) | (9) | (10) | (11) | (12) |
| Modified polyolefin | A-1 | 50 | 50 | 35 | 70 | 50 | 50 | 50 | | 10 | 90 | | |
| | A-2 | | | | | | | | 50 | | | | |
| | A-3 | | | | | | | | | | | 50 | |
| | A-4 (note 1) | | | | | | | | | | | | 50 |
| Aqueous acrylic resin | (B-1) | 20 | | 20 | 20 | 20 | 20 | 20 | 20 | 20 | 10 | 20 | |
| Aqueous urethane resin | (B-2) | 30 | 30 | 45 | 10 | 30 | 30 | 30 | 30 | 30 | | 30 | |
| Aqueous polyester resin | (B-3) | | 20 | | | | | | | | | | |
| Ketjen Black EC 300J | | 8 | 8 | 8 | 8 | | | 8 | 8 | 8 | 8 | 8 | 8 |
| VULCAN XC-72 | (note 2) | | | | | 8 | | | | | | | |
| JR-806 | (note 3) | | | | | | 150 | 100 | | | | | |
| Finished appearance (seediness, luster) | | ◯ | ◯ | ◯ | ◯ | ◯ | ◯ | ◯ | ◯ | ◯ | ◯ | ◯ | ◯ |
| Initial adherability | | 100/100 | 100/100 | 100/100 | 100/100 | 100/100 | 100/100 | 100/100 | 100/100 | 40/100 | 100/100 | 100/100 | 100/100 |
| Humidity resistance (adherability) | | 100/100 | 100/100 | 100/100 | 100/100 | 100/100 | 100/100 | 100/100 | 100/100 | 20/100 | 80/100 | 100/100 | 100/100 |
| Humidity resistance (blistering) | | ◯ | ◯ | ◯ | ◯ | ◯ | ◯ | ◯ | ◯ | Δ | ◯Δ | Δ | Δ |
| Gasohol resistance | | ◯ | ◯ | ◯ | ◯ | ◯ | ◯ | ◯ | ◯ | X | ◯ | Δ | ◯ |

Preparation of Test Coated Articles (1)

Bumpers molded of polypropylene (which had been degreased) were spray coated with each of above-formulated water-based primers (1)-(12) to a dry film thickness of about 5-10 μm, preheated at 80° C. for 3 minutes, and SOFLEX 415H (tradename, Kansai Paint Co., solvent-based coloring base coat paint) was electrostatically coated thereon as a coloring base coat to a dry film thickness of about 15 μm, followed by 3 minutes' preheating at 80° C. Thereafter SOFLEX 7500H Clear (tradename, Kansai Paint Co., acrylic-urethane derived solvent-based clear paint) was electrostatically coated thereon as a clear coat to a dry film thickness of about 30 μm, followed by 30 minutes' drying by heating at 80° C. Thus the test coated articles were prepared.

The test-coated articles as prepared in the above were given the following performance tests. The results are concurrently shown in the above Table 1.

Preparation of Test Coated Articles (2)

Bumpers molded of polypropylene (which had been degreased) were spray coated with each of above-formulated water-based primers (1)-(12) to a dry film thickness of about 5-10 μm, and WBC #713T (tradename, Kansai Paint Co., water-based coloring base coat paint) was electrostatically coated thereon as the coloring base coat to a dry film thickness of about 15 μm, followed by 3 minutes' preheating at 80° C. Thereafter SOFLEX 7500H CLEAR (tradename, Kansai Paint Co., acrylic-urethane derived solvent-based clear paint) was electrostatically coated thereon as a clear coat to a dry film thickness of about 30 μm, followed by 30 minutes' drying by heating at 80° C. Thus the test coated articles were prepared.

The test coated articles as prepared in the above were subjected to the following performance tests. The results are shown in Table 2.

Performance Test Methods (*1) Finished appearance: Seediness and luster of coating film surface were visually observed and evaluated according to the following standard.

○: No abnormality was recognizable.

x: One or more abnormal points were recognized in seediness or luster.

(*2) Initial adherability: Cut lines were drawn with a cutter in each coated surface to the depth reaching the substrate, to form 100 squares of each 2 mm×2 mm in size. On their surfaces an adhesive cellophane tape was stuck and then rapidly peeled off at 20° C. The number of squares remaining on the coated surface was examined.

(*3) Humidity resistance: A part of each of the coated bumpers was cut off and kept at 50° C. and under humid condition of at least 98% relative humidity for 10 days. Then ambient humidity was restored at room temperature and within 24 hours thereafter, each of the test specimens was given an adherability test similar to the above initial adherability test. Also the coated surfaces after drying were visually observed and evaluated according to the following standard.

○: No occurrence of blisters.

○Δ: Minor fogging occurred.

Δ: Fogging occurred.

x: Blisters occurred.

(*4) Gasohol resistance: A part of each of the coated bumpers was cut off and immersed in the test solution of gasoline/methanol=90/10 by weight at 20° C. After 30 minutes' immersion, blistering and peeling at edges of test specimens' coated surfaces was observed. Where there was no abnormality at all, the tested specimen was marked ○; blistering or peeling by not longer than 3 mm, marked ○Δ, blistering or peeling by more than 3 mm but not longer than 5 mm, Δ; and blistering or peeling by more than 5 mm, x.

TABLE 2

| | Example | | | | | | | | Comparative Example | | | |
|---|---|---|---|---|---|---|---|---|---|---|---|---|
| | 1 | 2 | 3 | 4 | 5 | 6 | 7 | 8 | 1 | 2 | 3 | 4 |
| Water-based primer | (1) | (2) | (3) | (4) | (5) | (6) | (7) | (8) | (9) | (10) | (11) | (12) |
| Finished appearance (seediness, luster) | ○ | ○ | ○ | ○ | ○ | ○ | ○ | ○ | ○ | ○ | ○ | ○ |
| Initial adherability | 100/100 | 100/100 | 100/100 | 100/100 | 100/100 | 100/100 | 100/100 | 100/100 | 40/100 | 100/100 | 100/100 | 100/100 |
| Humidity resistance (adherability) | 100/100 | 100/100 | 100/100 | 100/100 | 100/100 | 100/100 | 100/100 | 100/100 | 20/100 | 80/100 | 100/100 | 100/100 |
| Humidity resistance (blistering) | ○ | ○ | ○ | ○ | ○ | ○ | ○ | ○ | Δ | ○Δ | Δ | Δ |
| Gasohol resistance | ○ | ○ | ○ | ○ | ○ | ○ | ○ | ○ | X | ○ | Δ | ○ |

The invention claimed is:

1. A water-based composition comprising
   (A) an aqueous dispersion of modified polyolefin, which is prepared by dispersing a modified polyolefin (a) in an aqueous medium, the polyolefin (a) being produced by modifying an unsaturated carboxylic acid- or acid anhydride-modified polyolefin (i) having a melting point not higher than 120° C. and a weight-average molecular weight within a range of 30,000-200,000, further with a compound (ii) having hydroxyl group at its one terminus and polyoxyalkylene chain;
   (B) at least one kind of aqueous resin selected from the group consisting of aqueous urethane resin, aqueous acrylic resin and aqueous polyester resin; and
   (C) pigment;
   the solid weight ratio of the component (A)/component (B) being within a range of 20/80-85/15, and containing the component (C) in an amount within a range of 0.5-200 parts by weight per 100 parts by weight of the total solid resin content of the composition.

2. A water-based primer composition according to claim 1, in which the modified polyolefin (i) has the melting point of 50-100° C. and the weight-average molecular weight within a range of 50,000-120,000.

3. A water-based primer composition according to claim 1, in which the weight-average molecular weight (Mw)/number-average molecular weight (Mn) of the modified polyolefin (i) is within a range of 1.5-4.0.

4. A water-based primer composition according to claim 1, in which the polyoxyalkylene chain in the compound having a polyoxyalkylene chain is polyoxyethylene chain, polyoxypropylene chain, or blocked chain of polyoxyethylene and polyoxypropylene.

5. A water-based primer composition according to claim 1, in which the compound having a polyoxyalkylene chain has a number-average molecular weight within a range of 400-3,000.

6. A water-based primer composition according to claim 1, in which the aqueous urethane resin is a urethane dispersion.

7. A water-based primer composition according to claim 1, in which the aqueous acrylic resin and aqueous polyester resin each has a hydroxyl value within a range of 20-200 mgKOH/g and an acid value within a range of 1-100 mgKOH/g.

8. A water-based primer composition according to claim 1, in which the pigment (C) is an electrically conductive pigment.

9. A water-based primer composition according to claim 1, in which the weight ratio of solid contents of the component (A)/component (B) is within a range of 25/75-80/20.

10. A water-based primer composition according to claim 1, which further contains crosslinking agent.

11. A coating method of plastic shaped articles, characterized by comprising applying onto plastic shaped articles a water-based primer composition as described in claim 1, and then applying a top coat onto the coated surface.

12. A coating method according to claim 11, in which coloring base coat and clear coat are successively applied as the top coat.

13. Articles coated by the method as described in claim 11.

14. Articles coated by the method as described in claim 12.

* * * * *